United States Patent [19] | [11] 4,209,829
Leichle | [45] Jun. 24, 1980

[54] DIGITAL CONTROLLER FOR FUEL INJECTION WITH MICROCOMPUTER

[75] Inventor: Claude P. Leichle, Le Pecq, France

[73] Assignee: Regie Nationale des Usines Renault, Boulogne-Billancourt, France

[21] Appl. No.: 880,176

[22] Filed: Feb. 22, 1978

[30] Foreign Application Priority Data

Mar. 15, 1977 [FR] France ............................... 77 07607

[51] Int. Cl.$^2$ .......................... G06F 15/20; F02B 3/00

[52] U.S. Cl. ................................. 364/442; 73/119 A; 123/32 EA; 364/107; 364/431

[58] Field of Search ............... 364/442, 431, 424, 117, 364/107; 123/32 EA, 32 EB; 73/119 A

[56] References Cited

U.S. PATENT DOCUMENTS

| | | | |
|---|---|---|---|
| 3,835,819 | 9/1974 | Anderson Jr. | 364/442 |
| 3,858,561 | 1/1975 | Aono | 123/32 EA |
| 3,906,207 | 9/1975 | Rivere et al. | 123/32 EB |
| 3,935,851 | 2/1976 | Wright et al. | 123/32 EA |
| 3,969,614 | 7/1976 | Moyer et al. | 123/32 EB |
| 3,986,006 | 10/1976 | Kawai et al. | 364/431 |
| 3,991,727 | 11/1976 | Kawai et al. | 364/117 |
| 4,031,866 | 6/1977 | Asano | 123/32 EB |
| 4,034,719 | 7/1977 | Monpetit | 123/32 EB |
| 4,073,270 | 2/1978 | Endo | 364/431 |
| 4,084,240 | 4/1978 | Lappington | 123/32 EB |
| 4,096,833 | 6/1978 | Sweet | 123/32 EA |
| 4,099,495 | 7/1978 | Kiencke et al. | 364/424 |

OTHER PUBLICATIONS

Williams, M.; "A Digital Memory Fuel Controller for Petrol-Injection Engines"; Lucas Engnring. Review, vol. 6, No. 1; Jan. 1973; pp. 16–20.

*Primary Examiner*—Errol A. Krass
*Attorney, Agent, or Firm*—Oblon, Fisher, Spivak, McClelland & Maier

[57] ABSTRACT

A digital controller for fuel injection of internal combustion engines comprising a logic signal shaping circuit; an analog data acquisition circuit; a microcomputer incorporating a clock and memories; a circuit controlling injector opening timer and a second control circuit for accessories.

11 Claims, 6 Drawing Figures

DIGITAL CONTROLLER FOR FUEL INJECTION WITH MICROCOMPUTER

BACKGROUND OF THE INVENTION

The present invention relates to a digital controller for electronic injection.

Electronic injection offers advantages to the automobile with respect to both pollution and fuel consumption. This fact no longer needs demonstrating.

However, two conditions are imperative for the realization of a working injection system: for one, the precision of metering the fuel must be high and not variable with time or between components and, for the other, the equipment used must be reliable and low in cost.

One type of component having recently made its appearance in electronics is capable of helping to solve these two problems: that is, the integrated microcomputer. Actually, microprocessors have permitted resolution, in a satisfactory and economical manner, of many problems of this type. Still, there is a drawback: it is necessary, in order to use a microprocessor, to add to it many elements: read-only memories, storage memories, clocks, input-output peripherals, etc.

Microcomputers, for their part, have all these elements integrated on a single silicon wafer, and so in a single housing.

SUMMARY OF THE INVENTION

The present invention relates to a digital controller for electronic injection constructed around such a component. Moreover, the design of the overall circuit is such that the number of elements necessary for handling input signals and amplifying output signals is low. This is possible thanks to the utilization of special integrated circuits and hybrid assembly techniques, to the extent that the designing has been done in this direction which is the case for the invention.

Another advantage of the invention is the use of a programmed element. The microcomputer, as is known, has its function defined uniquely by the program written into it. It is the same then for the controller constructed on the basis of this microcomputer. Thus, a change in the motor corresponding to a variation if not in the rules of calculation, at least in the built-in parameter values, does not entail a modification of the arrangement. The only change is in the mask at the moment of fabricating the integrated circuit constituting the microcomputer, something which has become common practice in the semiconductor industry. The controller, the object of the invention, therefore has the flexibility making it universal vis-a-vis motors of different types with the same number of cylinders.

The principle utilized for control of the motor is well-known to one skilled in the art.

A sensor of the mass flow of air furnishes a reading which permits direct calculation of the amount of gasoline to be introduced into the motor. This quantity of fuel is introduced with the help of electromagnetic injectors open for a controlled time during each half-revolution of the engine. The injection is performed cylinder by cylinder, each injector being separately controlled. In addition the controller, the object of this invention, likewise activates two accessories, a cold-start injector as well as the fuel pump.

The calculation of the amount of gasoline is done by multiplying three factors together:

the mass of air $M_a$ present in the cylinder, the richness r of the mixture, the slope $K_i$ of the injector characteristic, i.e. the quantity of fuel injected during a unit opening.

The final result is directly the duration of injector opening: $z=M_a\times r\times K_i$.

The richness r is held constant in theory. However, certain limited conditions of operation demand an enrichment to ensure proper functioning of the motor:

the startup phase in which the enrichment is a function of the coolant temperature $T_A$. This phase corresponds to the activation of the starter DEM. In addition, the startup injector must be actuated during this time if the temperature $T_A$ is very low, the warm-up phase, with an enrichment depending on the temperature $T_A$. This enrichment is halted above a certain temperature, the idling phase, detected by the simultaneous low motor speed and low rate of air intake. There is an enrichment during this phase, the deceleration phase, in which there is an enrichment if a low rate of air intake is detected at high motor speed, a full-load phase, the enrichment being produced by closure of a switch on the throttle axis activated when the throttle is wide open, an acceleration phase, when the increase in the amount of air admitted is large from one cylinder to the next, and enrichment is triggered, the amount of which decreases slowly with time until it becomes zero.

For this mode of calculation the controller must be furnished certain data:

the amount of air $M_a$ per cylinder, also called filling, the motor speed, generally in the form of a series of pulses synchronous with cylinder firing times, the temperature of the motor coolant, a signal indicating activation of the starter DEM, a full-throttle signal by way of the switch mentioned above.

The controller determines on each motor revolution the injector opening time.

It must also provide the command. To give the order initiating opening, the firing pulses obtained from the breaker are utilized. Still, the injection being effected separately cylinder by cylinder, a cylinder reference pulse is needed to determine the order of injection. This pulse, obtained at spark plug no. 1, constitutes a supplementary parameter to be furnished to the controller.

The motor air filling, denoted by $M_a$, is determined from the reading of the instantaneous air flow by integration of this reading between two consecutive motor reference points. The integration time is thus a function of motor speed. This integration is realized in the very heart of the circuit doing the analog-to-digital conversion. There is used for this a data acquisition circuit such as is described in the French Pat. No. 77/00560 of Jan. 11, 1977 by the present Applicant, herewith incorporated by reference, for "analog data acquisition device for digital controller for automobiles", in a monolithic version since the set of components is amenable to integration.

Finally, the controller must be able to drive the injectors according to a current cycle comprising a fixed pull-in time with an exponential rise in current and a variable holding time with constant current such that the sum of the pull-in and holding times is equal to the time determined by the controller. The principle of such a control is described in the French Pat. No.

76/33533 of Nov. 5, 1976 by the present Applicant, herewith incorporated by reference, for "arrangement for control by current programming of several electro-valves with asynchronous operation simultaneous or not."

Finally, the controller must provide for activation of the startup injector and control of the electric fuel pump by the intermediary of a relay.

The general structure of the controller, conforming to the invention, is as follows. The whole thing is built around two buses, like all information processing systems: a data bus carrying eight binary digits in parallel and a control bus carrying all the sequential signals for the functioning of the elements. These are configured around the microcomputer to form:

a logic signal shaping circuit, realized from discrete components, an analog data acquisition circuit composed of a special integrated circuit, an injector control circuit made with hybrid techniques, and an accessory control circuit realized with discrete components.

The details of all these elements will be considered point by point.

The analog parameters which enter are the mass flow of air and the temperature. These data are introduced into a data acquisition circuit controlled by the microcomputer by the intermediary of the control bus, the microcomputer sending its result out on the data bus. The logic inputs, i.e. the breaker, the spark sensor, the full-throttle switch and the starter signal, are passed through shaping amplifiers to the microcomputer control bus.

An injector control circuit has a first part called the logic part, capable of transforming the number on the microcomputer bus into an opening time: the control signals for this circuit are obtained from the control bus. There exist so-called "tuner" circuits for performing this function which have several programmable down counters. An example is the 8293 circuit made by INTEL.

The second part, called the driver, is constructed on the principle of the arrangement constituting the object of the French Pat. No. 76/33533 of Nov. 5, 1976. A final circuit comprising two power elements wired as simple switches provides, in cooperation with the control bus, actuating signals for the auxiliary elements, viz. the fuel pump and the startup injector.

The microcomputer, then, is the central element of this system. The circuit having served as the basis of the arrangement which is the object of the invention is the 8048 microcomputer of the INTEL Company. But there are other microcomputers available or on the way in the laboratories of the semiconductor manufacturers. The use of another microcomputer poses no problem because of the similarities, both in principles and in fabrication, between the products of the different manufacturers. The elements making up a microcomputer are the following: a central unit assuring the automatic sequencing of the program as well as the performance of the arithmetic and logical operations, a read-write memory permitting storage of data in the course of the program, a nonvolatile read-only memory containing the calculation program as well as the different constants, a clock circuit stabilized by an external quartz crystal, an event counter for defining step voltages of given duration and input-output circuits with memory providing communication with the peripheral components. The data bus is standard and well-known to users of microcomputers.

The control bus, on the contrary, is different. It comprises the clock, the data bus read and write signals and a number of signals obtained at the microcomputer input-outputs and intended for control of the peripheral elements. This structure has many advantages. In addition to those already cited, reduced cost and increased reliability, there should be noted the flexibility in use since the numerical aspect of the device does not enter into its construction. In fact, the computer thus constructed can be applied to differently cylindered engines without modification in structure, the numerical values being introduced into the read-only memory. Moreover, and this advantage is tied to the employment of numerical techniques, the number of final adjustments in fabrication is very small, which is another source of cost reduction and diminution in the possible causes of deterioration in the course of operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The embodiment described below relates to a controller for a six-cylinder engine. The principle is the same. Only the number of input-outputs is different. There are six injectors to be individually controlled. The mass flow of air is gauged by two distinct sensors analyzing each row of three cylinders and the down count in time is given by two breaker signals spaced apart by 150° of the crankshaft, RUPT 1 and RUPT 2, each corresponding to a row of three cylinders. The extrapolation from the six-cylinder example described is simple since it consists of a reduction in the number of input-outputs.

Figure 1:
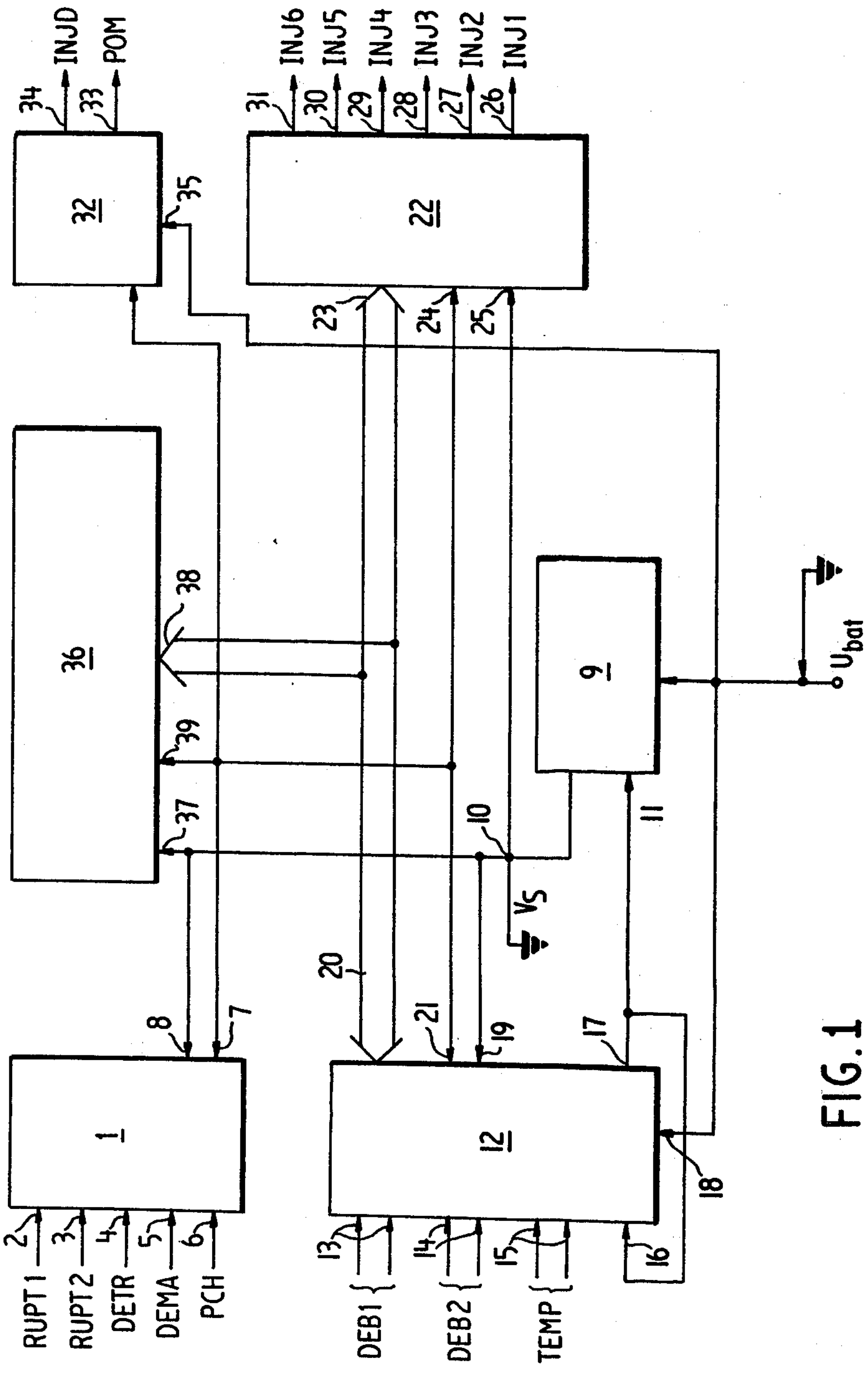
FIG. 1 represents in block diagram form a mode of realization of the complete controller of the invention.
Figure 2:
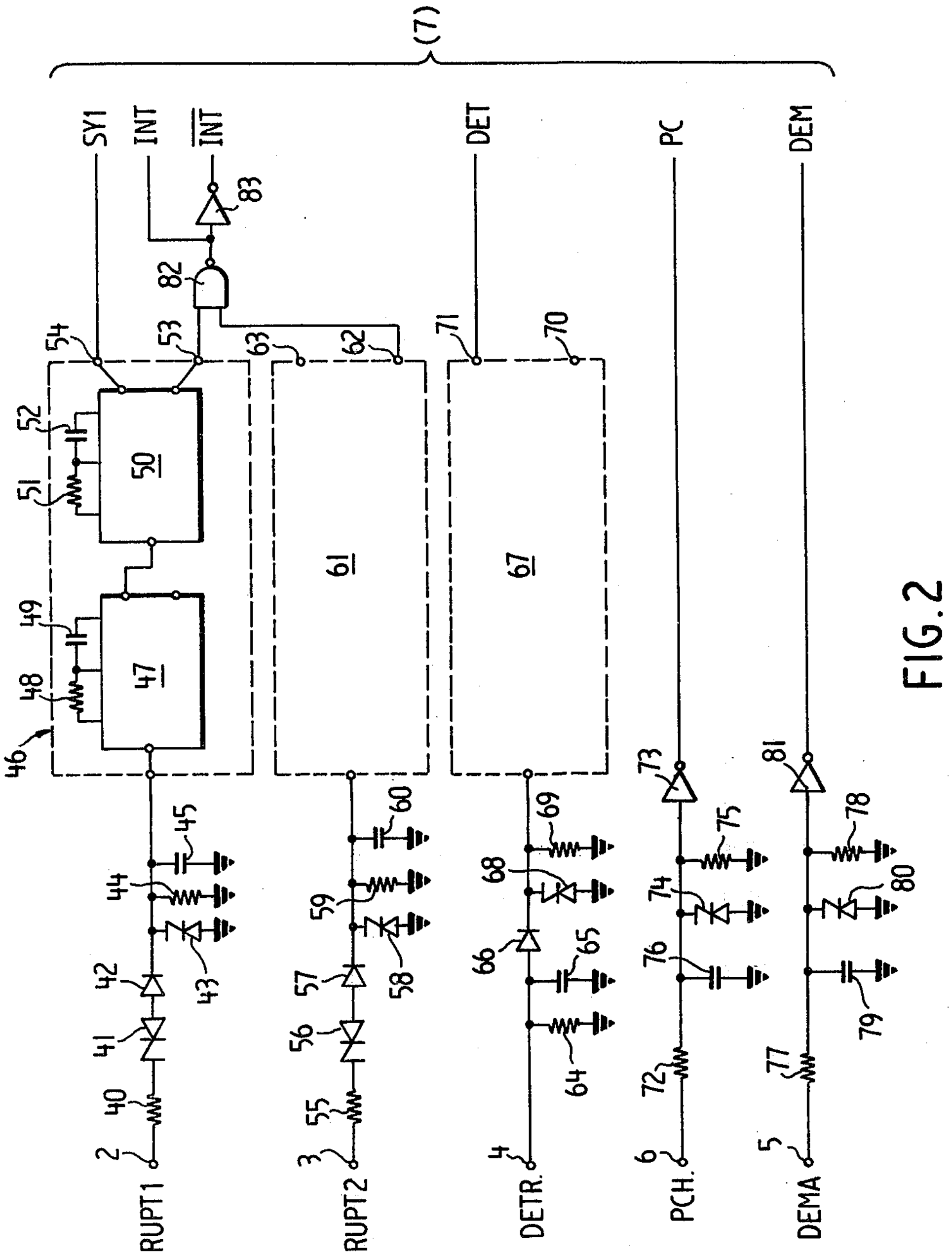
FIG. 2 shows in greater detail the logic data acquisition or shaping circuit.

Referring now to the drawings, wherein like reference numerals designate identical or corresponding parts throughout the several views, and more particularly to FIG. 1 thereof, FIG. 1 shows the framework of the controller of the present invention. A shaping circuit 1 receives the logic signals coming from the motor: "RUPT 1" and "RUPT 2" at its inputs 2 and 3 correspond to the instants of firing of spark plugs in rows 1 and 2 respectively; "DETR" at its input 4 corresponds just to the moment of firing of spark plug no. 1; "DEMA" at its input 5 corresponds to activation of the starter and "PCH" at its input 6 corresponds to the closing of the full-throttle switch. The circuit 1 generthird gear state lead 113. The output of the NOR gate 204 is connected through a lead 206 to the second input of the NOR gate 200, through a capacitor 208 to ground 210, and through an inverter 212 to a first input of a NAND gate 214. The second input of the NAND gate 214 is connected to the manual/automatic lead 98 and the output of the NAND gate 214 is connected to the reset input designated by R of the flip-flop 152. As previously mentioned, the Q' output is connected to the P/S lead 56. The Q output is connected by a lead 216 to the input of the oscillator circuit 154 and the set input designated by S of the flip-flop 152 is connected to the ground 210.

DESCRIPTION OF OPERATION

An overview of the automatic electronic transmission system operation may be had by reference to FIG. 1. The vehicle operator provides inputs at the shift control 36, the mode control 38, and the manual/automatic control 41 for the automatic electronic control 26. An operator manual override is also available at the hold shift control 40 and a power shift transmission output speed input is provided by the speed sensor 42. The output of the automatic electronic control 26 consists of selected voltage inputs to the starter circuit and motor 35, the lockup solenoid valve circuitry 28, and the solenoid valves circuitries 30–34.

Figure 3:
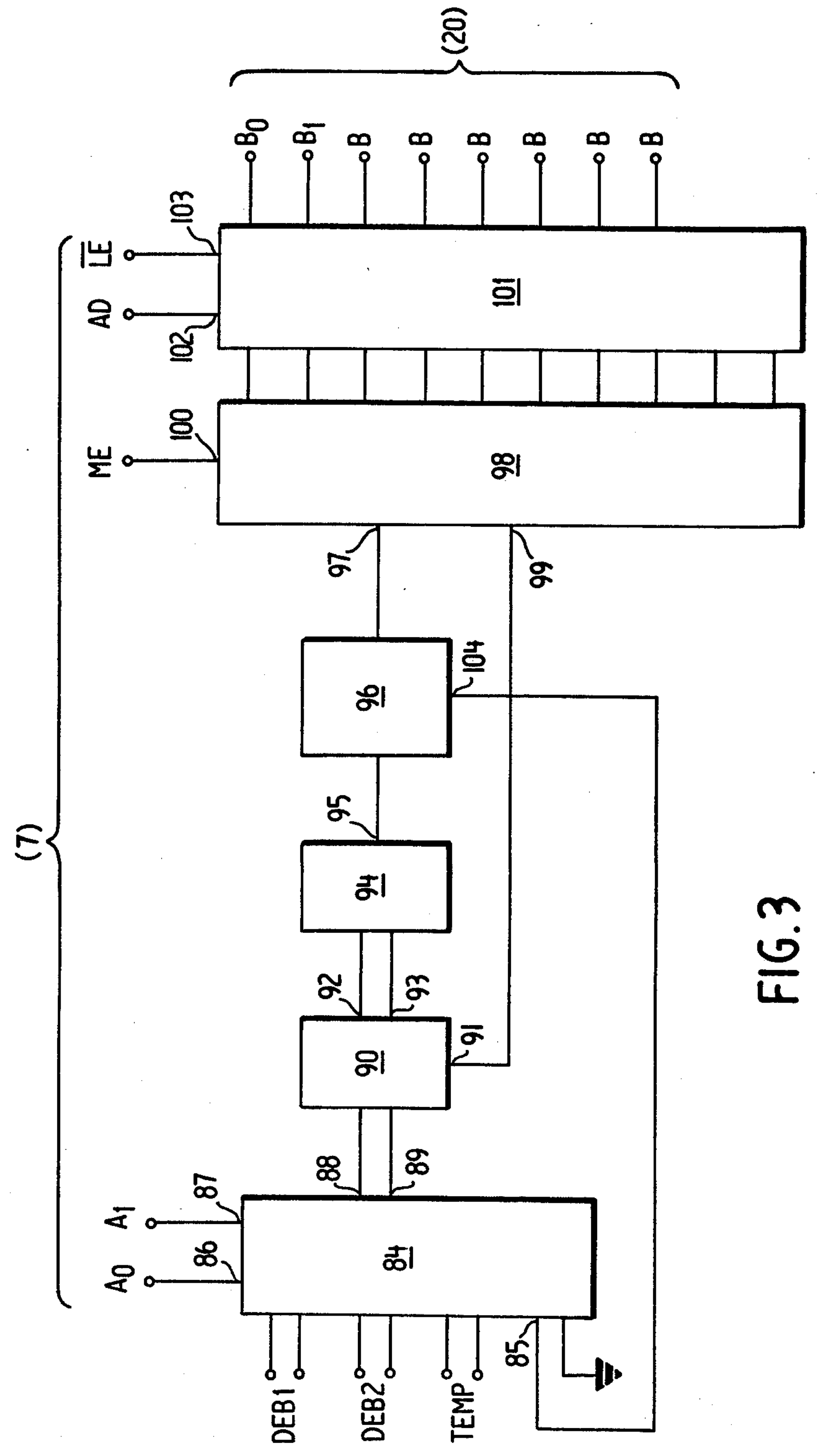
FIG. 3 shows in greater detail the analog data acquisition circuit utilized in the controller of FIG. 1.

When the operator selects manual transmission control at the manual/automatic control 41 and "work" moade at the mode control 38, the shift logic circuitry 43 is supplied with a digital logic, low voltage (henceforth "lo") through lead 98 and the torque converter lockup logic circuitry 78; and the work/transport logic circuitry 72; and the shift control logic circuitry 43 is supplied with digital logic, high voltages (henceforth "hi's") through leads 82, 84, and 97, respectively. As seen in FIG. 3, the "lo" on the lead 98 from the manual-/automatic control 41 is inputted to the AND gates 165–169 which disables inputs from the universal bus register 150 and which provide "lo's" to the NOR gates 171–175. In a neutral gear shift position, the shift controls 36 provide "hi's" to the reverse and first through sixth gear leads 45–51 and likewise, since the speed sensor 42 will indicate zero speed, the overspeed comparators 56–58 will provide "hi's" into the shift control logic circuitry 43.

In the shift control logic circuitry 43, as would be evident to those skilled in the art, a first gear ratio signal or a "hi" at the first lead 46 into the NOR gate 192 causes a "lo" at the terminal T1, a high at the second gear lead 47 into the NOR gate 175 causes a low at the terminal T2, "hi's" at both the third gear lead 48 and the over-speed lead 59 into the AND gate 190 cause a "hi" into the NOR gate 174 and thus a "lo" at the terminal T3, "hi's" at both the fourth gear lead 49 and the over-speed lead 60 into the AND gate 180 cause a "hi" into the NOR gate 173 and thus a "lo" at the terminal T4, "hi's" at both the fifth gear lead 50 and the over-speed lead 61 into the AND gate 178 cause a "hi" into the NOR gate 172 and thus a "lo" at the terminal T5, and a "hi" at the sixth gear lead 51 into the NOR gate 171 causes a "lo" at the terminal T6.

To assure that only one of the terminals T1 through T6 may be "hi" at any one time, a "hi" at the terminal T6 is fed back through the lead 176 to cause the NOR gate 172 and the terminal T5 to go "lo". The "hi" at terminal T6 is further fed back as a "hi" to the inputs of the OR gate 182 and the AND gate 173 which causes the terminal T4 to go "lo". The "hi" input into the OR gate 182 causes a "hi" input into the OR gate 186 and into the NOR gate 174 so as to cause the terminal T3 to go "lo". The "hi" input into the OR gate 186 causes it to go "hi" to provide "hi" inputs into the NOR gate 175 to cause the terminal T2 to go "lo" and into the NOR gate 192 to cause the terminal T1 to go "lo".

A "hi" at the terminal T5 is fed back through the feedback lead 106 to cause "lo's" at terminals T1 throuh T4 as previously described for when a "hi" appears on feedback lead 106. Since a "hi" on terminal T5 will automatically cause "lo's" at terminals T1 through T4, and since a "hi" at terminal T6 will cause to "lo" at T5, it will be apparent that only one of the terminals may be "hi" at a time.

A "hi" at the terminal T4 will cause a "hi" to be inputted into the OR gate 182 so as to cause a "hi" therefrom which will cause "lo's" at terminals T1 through T3. Similarly, a "hi" at the terminal T3 will cause a "hi" into the OR gate 186 to cause lo's at terminals T1 and T2, and a "hi" at the terminal T2 will cause a "hi" to be inputted to the NOR gate 192 to cause a "lo" at the terminal T1.

The "lo's" at the terminals T1–T6 and on the reverse lead 45, occurring in neutral, are processed by the decoder circuitry 108 which then provides a "hi" only to the starter lead 140 to allow the starter circuit and motor 35 to operate to crank the engine 12 for starting once power is applied to the system.

When the operator shifts to reverse gear, a "hi" is imposed on the reverse lead 45 which is decoded by the decoder circuitry 108 to cause the starter lead 140 to go "lo" and the solenoid leads 141, 142, and 143 to go "hi" so as to cause the transmission to go into reverse, and to provide a "hi" on lead 146 to cause a reverse warning from the reverse warning circuitry 147.

When the operator shifts into first gear, the shift controls 36 impose a "lo" on the first gear lead 46 as well as "lo's" on the overspeed leads 53–55. The "lo" on the first gear lead 46 causes the NOR gate 192 to provide a "hi" at the terminal T1. The "hi" at the terminal T1 causes the decoder circuitry 108 to provide "hi's" through the solenoid leads 142, 143, and 144 to activate the second, third, and fourth solenoid valve circuitries 31–33 respectively. With the terminal T1 "hi", an indication is also provided by the first gear indicator 117.

When the operator shifts into second gear, the shift controls 36 impose an additional "lo" on the second gear lead 47 in addition to those "lo's" mentioned for the first gear. The "lo" on the second gear lead causes the output of the NOR gate 175 to go "hi" and provide a "hi" at the terminal T2 while causing the NOR gate 192 to go "lo". The decoder circuitry 108 causes the solenoid leads 142 and 143 to go "hi" to activate the second and third solenoid valve circuitries 31 and 32 so as to cause the transmission to shift from first to second gear. The "hi" on the terminal T2 further causes an indication at the second gear indicator 118.

When the operator shifts into third gear, the shift controls 36 impose a "lo" on the third gear lead 48 in addition to the previously mentioned "lo's" due to the first and second gears. The "lo" on the third gear lead 48 will cause the AND gate 190 to go "lo". The output of the overspeed comparator 56 will be "hi" as long as the transmission output speed is under a first predetermined overspeed value. A "lo" output from the AND gate 190 combined with "lo" inputs on the other two inputs causes the NOR gate 174 to go "hi" and impose a "hi" on the terminal T3. The high at the terminal T3 causes an indication from the third gear indicator 119. The "hi" at the terminal T3 causes the decoder circuitry 108 to provide "hi's" to the third and fourth solenoid valve circuitries 32 and 33 to cause the transmission to shift from second to third gear.

When the operator shifts into fourth gear, the shift controls 36 impose a "lo" on the fourth gear lead 49 in additon to the "lo's" due to the first through third gears. The "lo" on lead 49 will cause a "lo" out of the AND gate 180 as long as there is a "lo" from the overspeed comparator 57. The overspeed comparator 57 will remain "hi" as long as the transmission output speed is below a second predetermined over speed value. The "lo" out of the AND gate 180 causes a "hi" out of the NAND gate 173 which provides a "hi" at terminal T4. This causes an indication from the fourth gear indicator 120 and the decoder circuitry 108 to provide "hi's" to the third solenoid valve circuitry 32 to shift the transmission into the fourth gear ratio.

When the operator shifts into fifth gear, the shift controls 36 impose a "lo" on the fifth gear lead 50 which will cause the AND gate 178 to provide a "lo" output. The overspeed comparator 58 will provide a "hi" as long as the transmission output speed is below a third predetermined overspeed value. The "lo" from the AND gate 178 causes the output of the NAND gate 172 to go "hi" and provides a "hi" at the terminal T5. The decoder circuitry 108 processes the "hi" at terminal T5 to provide a feedback signal along the lead 106 to disable the lower gear states and provide "lo's" at terminals T1–T4. A "hi" at the terminal T5 causes an indication from the fifth gear indicator 121 and causes the decoder circuitry 108 to provide "hi's" to second through fifth solenoid valve circuitries 30–34 to cause the transmission to shift into fifth gear.

When the operator shifts into sixth gear, the shift controls 36 will impose a "lo" on the sixth gear lead 51 in addition to the "lo's" imposed for the first through fifth gears. The "lo" on the sixth gear lead 51 will cause the NOR gate 171 to provide a "hi" to cause the terminal T6 to go "hi". The "hi" at the terminal T6 will cause an indication at the sixth gear indicator 122 as well as provide "hi's" to the third through fifth solenoid valve circuitries 32–34 to cause the transmission to shift into the sixth gear.

During the previously described shifting, the mode control 38 in the work mode provides a "hi" to the torque converter lockup logic circuitry 78 which imposes a "lo" on the lockup lead 80. The "lo" on the lockup lead 80 enters the A6 input of the universal bus register 150 and exits through output B6 to lead 110 which imposes a "lo" on the lockup delay circuitry 136, the output of which is held to "lo" so as to prevent activation of the torque converter lockup solenoid circuitry 28.

As the operator downshifts in manual from sixth to neutral, the operation will be exactly the reverse from that described above. It should be noted in addition, that if the transmission output speed is greater than the first, second, or third predetermined overspeed values during the third, fourth, or fifth gear operations, respectively, the transmission will not downshift. This feature provides damage protection for the transmission by preventing downshifting, even with manual shifting, at excessive speeds and further allows the operator to brake the vehicle with the transmission except when a downshift will overspeed the engine.

When the operator selects automatic transmission control at the manual/automatic control 41 while keeping the mode control 38 on the "work" mode, the shift control logic 43 is provided with a "hi" on the lead 98 which provides "hi's" to the inputs of the AND gates 165–169, and to the NAND gate 214. The "hi" from the mode control 38 carried by the lead 96 causes the output of the NOR gate 202 to go "lo" and the output of the NOR gate 200 to also go "lo" since the other input thereto is a "hi" from the NOR gate 204 which has all "lo" inputs. The "lo" input from the NOR gate 200 to the data input of the flip-flop 152 results in a low from the Q′ output into the parallel series input of the universal bus register 150. This results in any signal to the A1 through A6 inputs to be outputted from the B1 through B6 outputs, respectively. As evident, the "hi" from the mode switch 38 into the lockup logic converter 78 is outputted as a "lo" through lockup lead 80 to the shift control logic circuitry 43 where it is inputted into the A6 input and outputted as a "lo" out of the B6 output and then processed by the lockup delay circuitry 136 where it inhibits any "hi" signals from being sent to the torque converter lockup solenoid circuitry 28.

When the operator shifts between reverse, neutral, and first gear in the work mode, the automatic electronic control 26 functions in the same manner as under manual control. While the mode control 38 in the work mode acting through the torque converter lockup logic circuitry 78 on the work/transport logic circuitry 72 enables the speed comparators 64–66, 68 and 70 to operate, they will have no effect in the aforementioned three gear positions.

When the operator shifts into second gear with the transmission output above a first predetermined upshift speed, the speed comparator 64 will provide a "hi" to the work/transport logic circuitry 72 which will be processed with the "lo" on the first lead 86 to provide a "lo" to the shift delay circuitry 96. In the shift delay circuitry 96, the introduction of the "lo" to the shift control logic circuitry 43 will be delayed a predetermined amount of time to prevent hunting during the automatic shifting from first to second gear. The "lo" on the second gear shift lead 90 is inputted to the A5 input of the universal bus register 150 and outputted to the AND gate 169 from the output B5. When the "lo" is inputted into the AND gate 169, a "lo" will be outputted to the NOR gate 175 which provides a "hi" to the terminal T2 to cause the transmission to be shifted into second gear.

If the transmission output speed drops below a first predetermined downshift speed, the speed comparator 64 will provide a "lo" to the work/transport logic circuitry 72 which in conjunction with the shift control logic circuitry 43 will cause the the terminal T2 to go "lo" and the terminal T1 to go "hi" to automatically downshift from second to first gear. The difference between th upshift and downshift predetermined speeds is due to a speed comparator hysteresis which serves to prevent hunting during automatic gear shifts.

When the operator shifts into third gear with the transmission output above a second predetermined upshift speed, the speed comparator 65 will provide a "hi" to the work/transport logic circuitry 72 which will be processed with the "lo" on the second lead 88 to provide a "lo" which will be delayed by the shift delay circuitry 96 and then processed by the shift control logic 43 to provide a "hi" at the terminal T3. Operation of the logic in the shift control logic circuitry 43 is and 114 of the counters. This sequence starts the down counting of the clock signal H applied to inputs 115 and 116 and, consequently, the appearance at the output of the selected down counter of the step voltage lasting for the calculated opening time. This step voltage, in negative logic in the case of the 8253 circuit, is applied to the inputs of amplifiers 123 to 128. Supposing output 117 to be activated, amplifier 123 is the one used and explanation is thus made easier. Simultaneously with the application of the step voltage to input 142, the single shot 129 delivers a rectangular pulse to the input 142 of amplifier 123 and an exponential pulse, due to the charging of capacitor 137, to the input 143. Input 144 receives a constant voltage fixed by the resistive divider 139–140. The falling leading edge of the signal at 141 frees the transistor 146 and sets to one the flip-flop 147 reset some microseconds earlier by the signal at 142. As a result, the exponential voltage at 143 is applied to the input of the combination - amplifier 152, transistor 153, resistors 154–155, capacitor 156 - constituting a voltage-to-current converter. Consequently, the current to the injector is exponential. When the pulse generated by the single shot 129 ends, the flip-flop 147 is reset to zero via 132 and 142 and the switch 149 is closed, switch 148 being open. The voltage applied is then constant, as is the current going to the injector. When the pulse at the output 117 of the counter 105 disappears, transistor 146 becomes conducting again and the voltage at the input to the voltage-to-current converter goes to zero, as also, then, does the current to the injector which closes. Thus, the sequence pull-in current-holding current is strictly observed, and this during the time calculated by the computer as the opening time for the injector. The circuit described is optimized so as to do the job with the minimum number of components. The actual realization is done by hybridizing the set of components, excepting the two counting circuits 105 and 106. At this level, the utilization of a hybrid circuit has three advantages: increased reliability, lowered cost and ease of maintenance.

Figure 5:
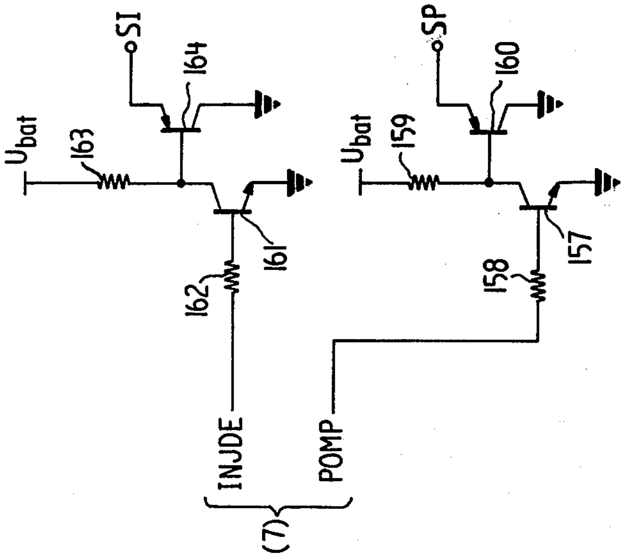
FIG. 5 shows the circuit for controlling the accessories or the amplifier circuit.

FIG. 5 represents the amplifier 32 for driving the accessories. For one, the fuel pump control circuit: a transistor 157 receives at its base via a resistor 158 the signal POMP from control bus 7. The collector of this transistor is tied by a resistor 159 to the positive battery terminal and drives the base of a PNP transistor 160. This has its emitter grounded and its collector controls the charging, i.e. the relay operating the fuel pump. For the other, the control circuit for the startup injector is identical. A transistor 161 with its base driven through a resistor 162 has its emitter grounded and its collector tied, on the one hand, to the positive battery terminal via a resistor 163 and, on the other, to the base of a PNP transistor 164 driving the startup injector.

In both instances, since the circuits are identical, the operation is the same: when the input signal from control bus 7 is a positive voltage, the steering transistor 161 (or 157) conducts along with the output transistor 164 (or 160) which thus enables current to flow to the injector.

Figure 6:
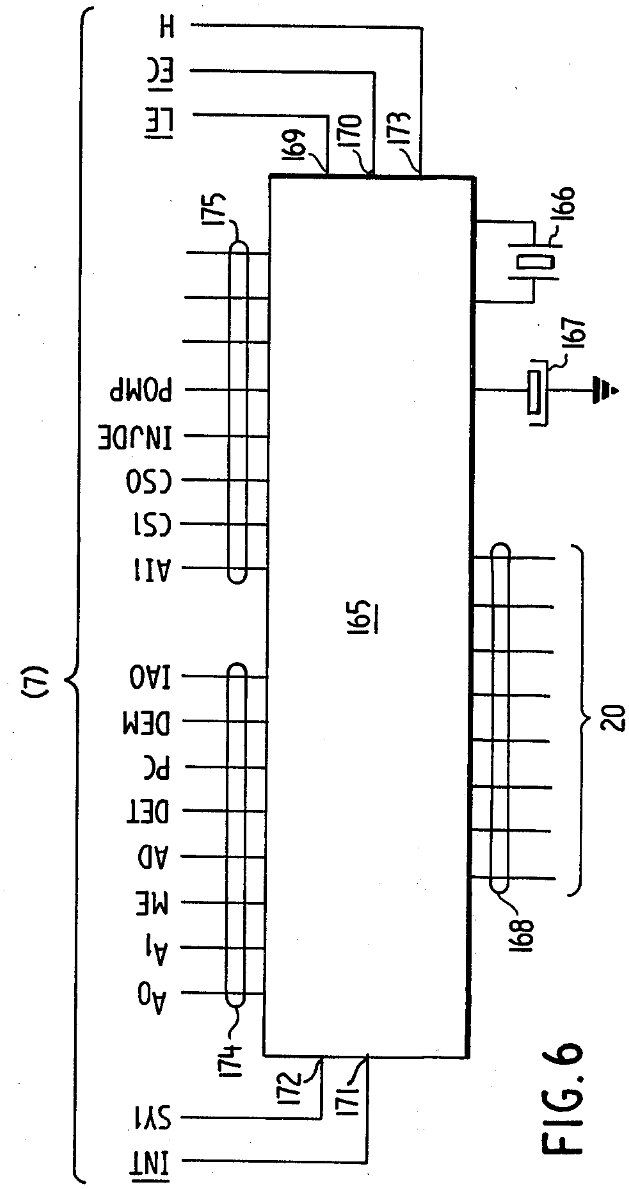
FIG. 6 represents the microcomputer which is the center of the controller of the invention.

FIG. 6 represents the microcomputer, denoted by 36 in FIG. 1. This microcomputer is in the form of a monolithic integrated circuit 165 with which two discrete components are associated: a quartz clock oscillator crystal 166 and a capacitor 167. Every connection of the eight-binary-digit data bus 20 and of control bus 7 has its origin in the microcomputer which, in the example described, is the 8048 circuit of the INTEL Company.

The input and output designations for the circuit are those used in this Company's publications.

Figure 4:
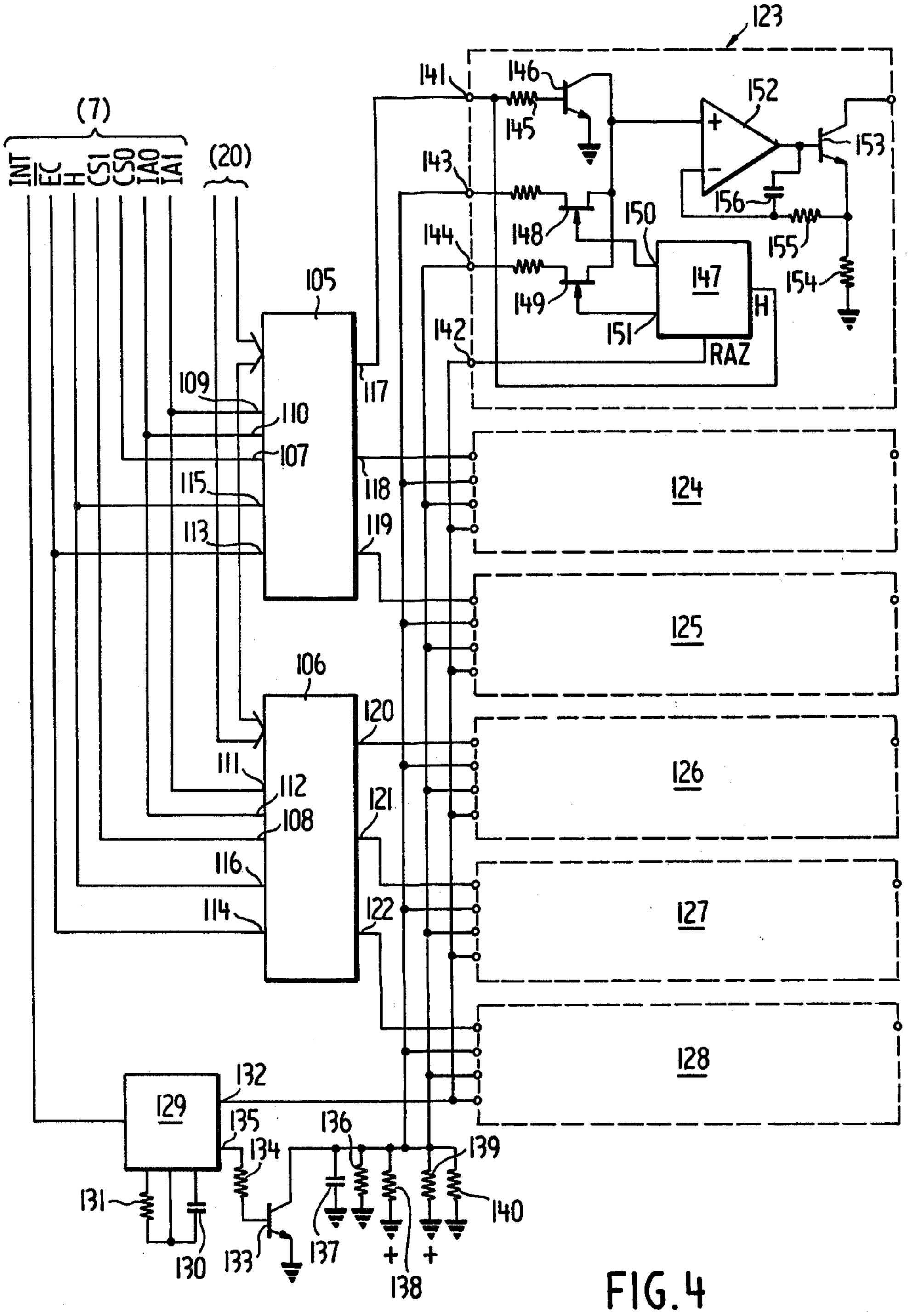
FIG. 4 represents the circuit controlling the opening time of the injectors.

The data bus 20 is connected to the eight outputs of the data bus 168 of the microcomputer. The other connections form the control bus 7. The data read and write commands $\overline{LE}$ and $\overline{EC}$ on bus 7 are connected directly to the outputs $\overline{RD}$ 169 and $\overline{WR}$ 170 of the microcomputer. The interrupt input 171 receives the signal $\overline{INT}$ generated by the logic 1 data acquisition circuit, just as the testable input T. 172 receives the synchronization signal. Finally, a pin 173 designated ALE puts out a fixed frequency signal H from the quartz clock. This signal is applied to the clock connection of the control bus and serves for down counting the time of injection in the down counters 105 and 106 of the output circuit 22 illustrated in FIG. 4.

The microcomputer 165 has, in addition, two sets of eight-binary-digit input-outputs 174 and 175. Each pin can be used indifferently as input or output according to the programming. The first set 174 is used in its entirety and receives the connections $A_o$, $A_1$, ME, AD of data acquisition circuit 12, DET, PC, DEM of the shaping circuit 1 and $IA_o$ going to the output circuit 22. The second set 175 is only partially used. It receives the connections $IA_1$, $CS_o$, $CS_1$ to the output circuit 22 and INJ DE and POMP to the amplifier circuit 32. The three unused connections are available for possible extensions of the controller functions.

The overall operation of the controller is fixed by the program deposited in the read-only memory of the microcomputer. The calculation sequence is as follows: when the motor, by its ignition system, generates a spark, the shaping circuit 1 receives a pulse at one of its inputs RUPT 1 or RUPT 2 and generates a pulse on $\overline{INT}$ via inverter 83. Depending on the row of the cylinder fired, this pulse is or is not accompanied by a pulse at the output SY, and at the output DET, as has been explained above. The microcomputer 165, when it receives an interrupt pulse $\overline{INT}$, stops in its program according to a standard procedure and examines its inputs $SY_1$ and DET to determine the row of the cylinder fired in order to activate the appropriate injector by the sequence described in the paragraph relative to the injector control amplifier 22.

The calculation sequence extends over several cycles, i.e. during the sequence, several $\overline{INT}$ pulses are applied. This sequence is as follows: a first measurement phase corresponds to the measurement of the motor air filling $M_a$. For this, the microcomputer determines the appropriate address for $A_o$ and $A_1$ of the input multiplexer 84 in FIG. 3. Then it activates the signal input ME 100 in FIG. 3 for the time period between two INT signals, i.e. during the time of filling a cylinder with air. At the end of this time the signal ME is deactivated and the result is applied to the data bus 20 by the command of the signals AD and LE. The result is placed in a read-write memory of the microcomputer. The next phase is a measurement of the temperature or of the reference voltage depending on the case, the two measurements being alternated. The same signals are applied in sequence. Only, the signal ME is different. In fact, it must be activated for a constant time, the said time being determined by counting the internal clock signal in the counter provided within the microcomputer. The result of the measurements is placed in other read-write memories of the microcomputer. The next phase is that of the calculation proper. The microcomputer tests the input DEM which, generated by circuit 1, indicates whether the starter is being used and, depending on the result, calculates the coefficient for warmup or startup as a function of temperature. Next, the microcomputer tests the input PC generated by circuit 1 and which is activated when the motor is at full-throttle. Similarly, tests of the value of the filling placed in memory, as well as the value of motor speed calculated by counting the internal clock frequency between two breaker signals (period meter), determine the value to be used for the coefficient of transient regimes, acceleration and deceleration, or the idling phase. The coefficients to be applied in these cases are deposited in the controller's read-only memory and thus are fixed once and for all. The next step in calculation is the multiplication of the air filling by the desired richness (which is a constant in the read-only memory), then by the various coefficients previously calculated and, finally, by the correction coefficient for input gain obtained from the reference voltage measurement. The result thus determined is placed in memory and is applied to the injectors at the next appearance of the INT signal. Actually, two identical calculations are done alternately, those for cylinder row no. 1, on the one hand, with measurement of DEB 1 by the acquisition circuit 12, then those for row no. 2 with measurement of DEB 2, on the other.

The startup injector, controlled by the signal INJ DE, is activated at the same time as the starter, after test of the temperature by the computer. If it is too high, the startup injector is not activated. Finally, the fuel pump is started as soon as the controller is turned on and the computer tests the motor speed to cut the pump supply (by the signal POMP) when the speed goes to zero. This function is a safety feature in case of an accident.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A digital electronic controller for controlling the duration of fuel injection for an internal combustion engine comprising:

a programmed microcomputer;

a data acquisition system associated with the microcomputer;

a shaping circuit serving as an interface between signal inputs and the microcomputer;

a driver for electrovalves associated with injectors of the internal combustion engine;

an amplifier connected to the output of the microcomputer as a driver circuit for accessories;

first bus means connected to the shaping circuit, the data acquisition system, the microcomputer and the electrovalve driver for carrying control signals between the shaping circuit, the data acquisition system, the microcomputer and the electrovalve driver;

second bus means connected to the data acquisition system, the microcomputer and the electrovalve driver for carrying data between the data acquisition system, the microcomputer and the electrovalve driver;

wherein when the microcomputer receives an interrupt pulse (INT) generated by the shaping circuit when a cylinder of the internal combustion engine is fired, it stops in its program and examines its inputs to determine the row of the cylinder fired and activates the corresponding injector, and the calculation sequence of the program in the microcomputer extends over several cycles, i.e. during the sequence several pulses (INT) are generated;

the microcomputer and the data acquisition system including means for measuring, during a first phase the air supply ($M_a$) to the motor by counting between two successive interrupt pulses; and means for measuring during a second phase the temperature of the motor cylinder head and a reference voltage alternately, the air supply and temperature measurements being alternated; and wherein said microcomputer determines the optimum duration of the opening of said injectors by multiplying said air supply measurement ($M_a$) successively by a richness factor, a coefficient corresponding to the operating conditions of the internal combustion engine calculated by said microcomputer from said temperature measurement and said signal inputs, and by a correction coefficient for input gain obtained from said reference voltage measurement.

2. The digital controller recited in claim 1 wherein:

the means for measuring the air supply ($M_a$) to the motor includes a multiplexer of the microcomputer and an up-down counter of the data acquisition system wherein the microcomputer determines the proper address in the multiplexer and then activates an input to the up-down counter of the data acquisition system during the time of filling a cylinder with air.

3. The digital controller recited in claim 2 wherein:

said digital electronic controller operates to control the fuel injection for a six-cylinder internal combustion engine having said six cylinders arranged in two rows of three cylinders each wherein said air supply measurement ($M_a$) comprises two separate air flow signals (DEB 1 and DEB 2) measured by two separate sensors each monitoring one row of three cylinders; and wherein the down-count time is given by two breaker signals (RUPT 1 and RUPT 2) spaced by 150° of the crankshaft, each of the signals corresponding to a row of three cylinders, so that the shaping circuit has five logic inputs in parallel, i.e. RUPT 1, RUPT 2, the cylinder reference (DETR), full load and starter signals while the data acquisition system has at least two differential analog signals (DEB 1 and DEB 2) for the differential input multiplexer and including: an antiparasitic circuit in each of the circuits handling the first three signals for suppressing parasitic pulses, each of the antiparasitic circuits being composed of a sequence of a first retriggerable single shot and a second non-retriggerable single shot connected to the noninverting output of the first single shot.

4. The digital controller recited in claim 3 wherein:

a synchronizing signal ($SY_1$) of the first bus means is obtained at the noninverting output of the antiparasitic circuit associated with the signal RUPT 1 while the inverting outputs of the two antiparasitic circuits associated with the first two signals (RUPT 1 and RUPT 2) are connected to the inputs of a NAND logic gate the direct output of which furnishes a signal INT and, by the intermediary of an inverter, the signal INT for the first bus means.

5. The digital controller recited in claim 1 wherein: the means for measuring the temperature and the reference voltage includes an internal clock of the microcomputer and an up-down counter of the data acquisition system wherein the microcomputer activates an input to the up-down counter during a fixed time determined by counting from the internal clock of the microcomputer.

6. The digital controller recited in claim 1 wherein said second bus means is a conductor having an eight-binary-digit capacity which connects through a bus adapter the data acquisition system to the microcomputer, and to two down counters in parallel which form the input circuit to the injector driver.

7. The digital controller recited in claim 1 wherein: the driver of the injector electrovalve includes a first single shot and a driver amplifier in association with each injector and each driver amplifier has a first input for receiving a step voltage proportional to a calculated duration of opening, a second input associated with a capacitor connected between ground and the collector of a first transistor tied to the inverting output of the first single shot, a third input connected to the midpoint of a resistive divider between battery positive and ground and a fourth input connected to the noninverting output of the first single shot for receiving a rectangular pulse from the first single shot.

8. The digital controller recited in claim 7 including: two down counters connected to said first bus means for carrying control signals between the shaping circuit, the data acquisition system, the microcomputer and the electrovalve driver, and;

wherein each power amplifier of the injector electrovalve driver includes a second transistor and a JK type flip-flop and the first input from one of the outputs of one of the two down counters is connected both to the base of the said second transistor and to the clock input of the JK flip-flop; the second input and the third input are each connected to the input of an analog switch controlled respectively by the noninverting and inverting outputs of the JK flip-flop and the switch outputs are connected in parallel to the collector of the second transistor and the fourth input is connected to the zero-reset input of the JK flip-flop.

9. The digital controller recited in claim 1 wherein said microcomputer makes a determination of transient sequences and determines a value of a transient regime coefficient used in optimizing the duration of the opening of said injector by examining the signals present at the output of the shaping circuit and present at the output of the data acquisition system as well as those signals placed in memory during preceeding phases.

10. The digital controller recited in claim 1 wherein said digital electronic controller operates to control the fuel injection for a six-cylinder internal combustion engine having said six-cylinders arranged in two rows of three cylinders each wherein said air supply measurement ($M_a$) comprises two separate air flow signals (DEB 1 and DEB 2) measured by two separate sensors each monitoring one row of three cylinders; and wherein said microcomputer alternately performs two identical calculations of the time of opening the electrovalves associated with the injectors, relative to the first row of three cylinders by measurement of one mass air flow signal (DEB 1) by the data acquisition circuit, then to the other row of three cylinders by measurement of the other mass air flow signal (DEB 2) by the data acquisition circuit.

11. The digital controller recited in claim 1 wherein a startup command signal (INJ-DE) is transmitted from said microcomputer to said accessory driver amplifier by said first bus means after a test of the temperature of the motor coolant by a suitable sensor and after reception of a starter activation signal (DEM) by said microcomputer.

* * * * *